A. LATTAU.
AUTOMATIC PHOTOGRAPHING APPARATUS.
APPLICATION FILED FEB. 10, 1908.
1,135,032.
Patented Apr. 13, 1915.
5 SHEETS—SHEET 2.
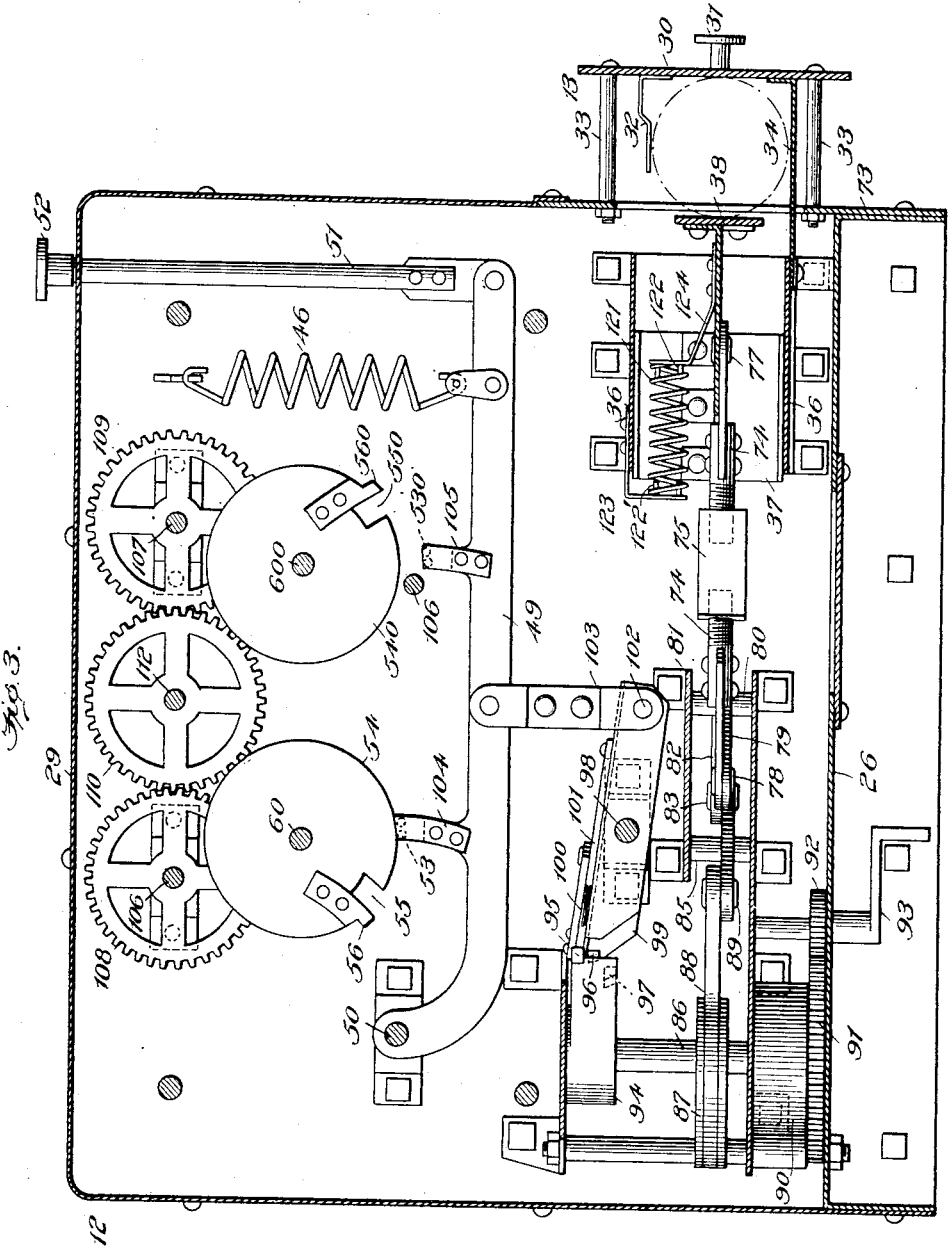

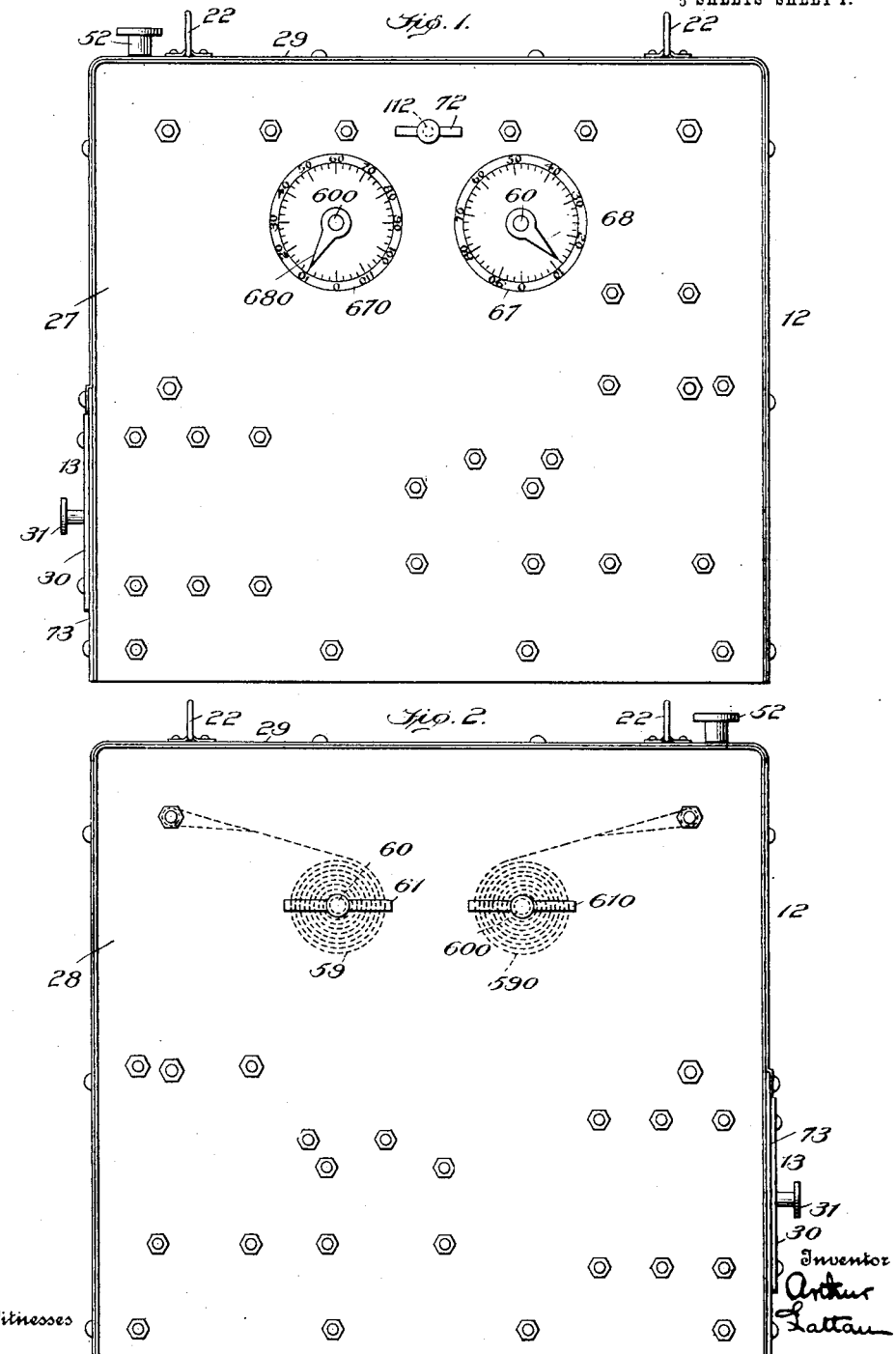

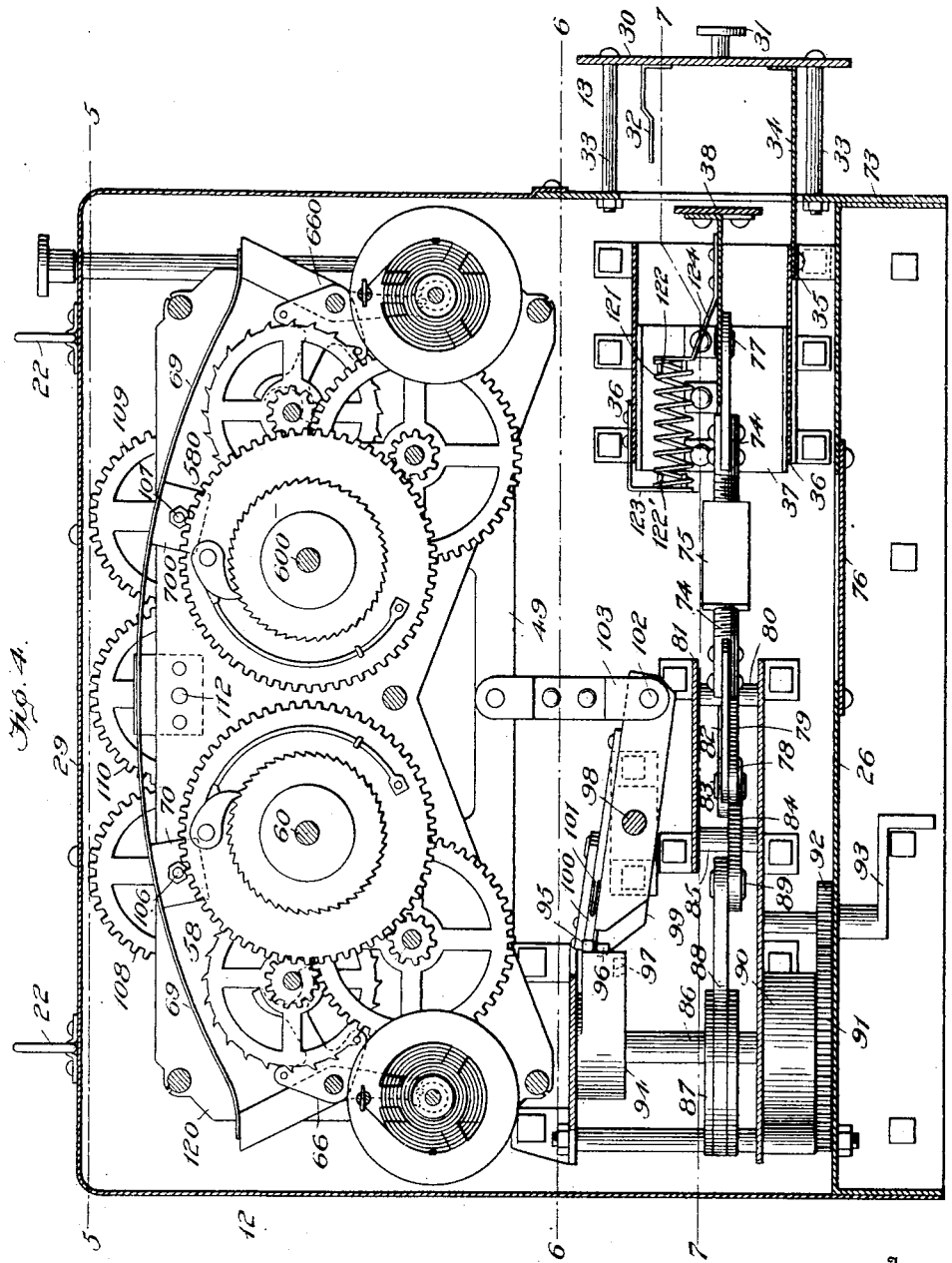

A. LATTAU.
AUTOMATIC PHOTOGRAPHING APPARATUS.
APPLICATION FILED FEB. 10, 1908.
1,135,032.
Patented Apr. 13, 1915.
5 SHEETS—SHEET 4.
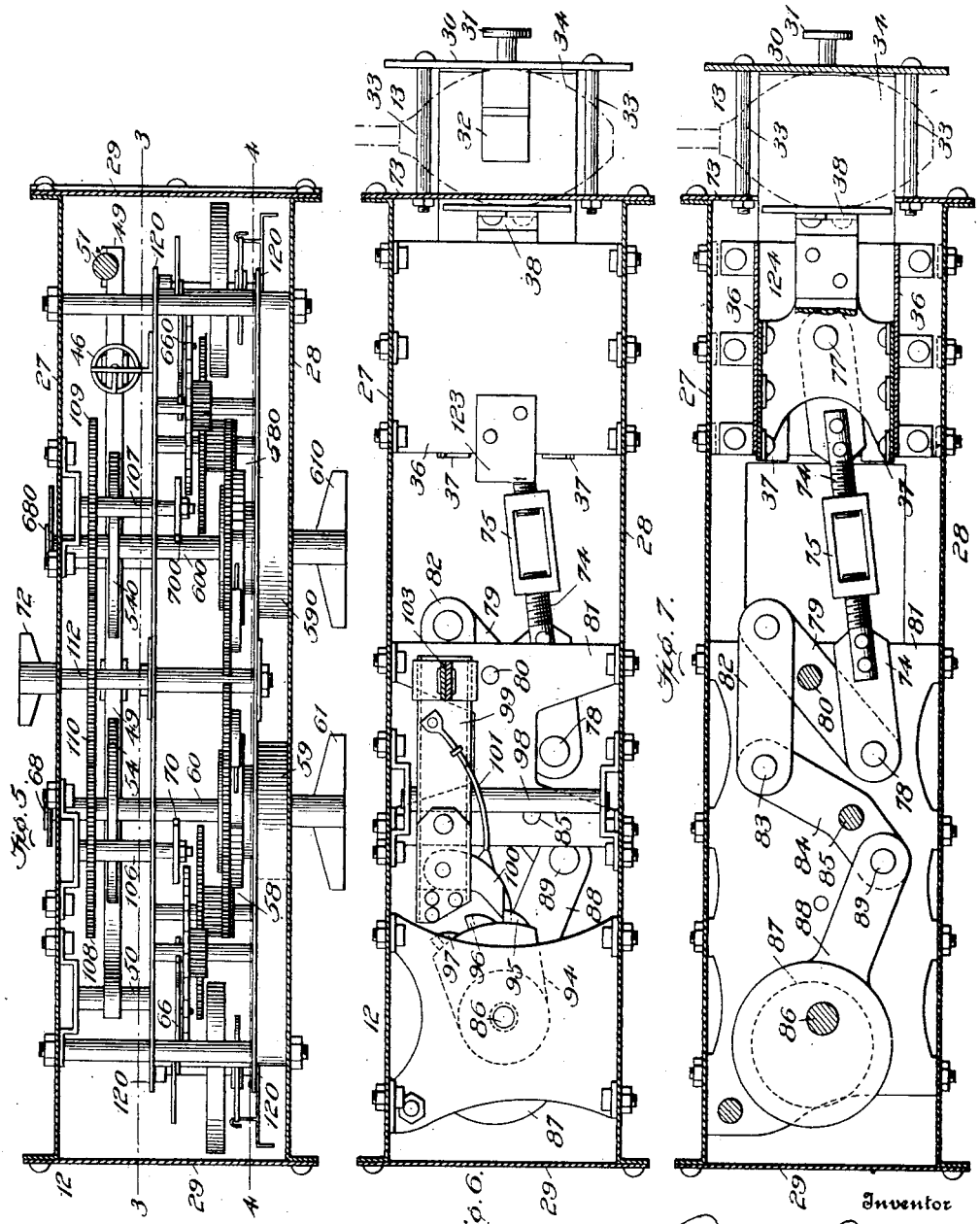

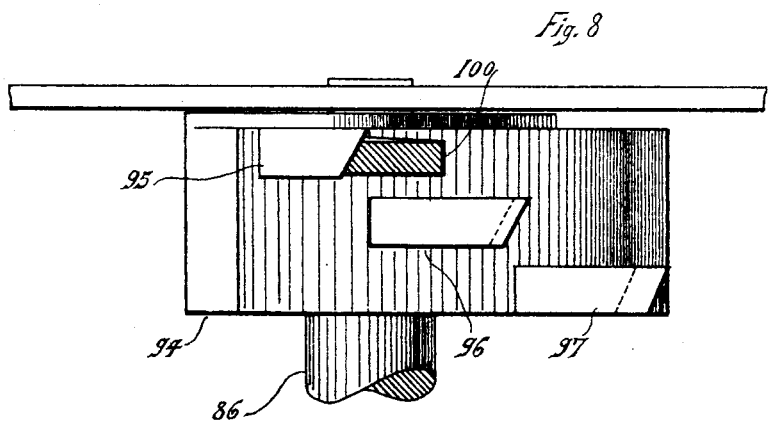

UNITED STATES PATENT OFFICE.

ARTHUR LATTAU, OF NEW YORK, N. Y.

AUTOMATIC PHOTOGRAPHING APPARATUS.

1,135,032.      Specification of Letters Patent.      Patented Apr. 13, 1915.

Application filed February 10, 1908. Serial No. 415,139.

*To all whom it may concern:*

Be it known that I, ARTHUR LATTAU, a citizen of the United States, residing at New York, in the county of New York and State of New York, have invented or discovered certain new and useful Improvements in Automatic Photographing Apparatus, of which the following is a specification, reference being had therein to the accompanying drawings.

This invention relates to a device for automatically operating the shutter of a photographic camera in the absence of a photographer in order to expose the plate or film within said camera at a predetermined time and for a predetermined period.

In Letters Patent No. 1,092,273 granted to me April 7, 1914, I have shown and described an apparatus adapted to exert a pressure on the end of a flexible power transmitter, ordinarily employed to operate a camera shutter, at a predetermined time in the absence of the operator, for the purpose of operating the shutter to make an exposure at such predetermined time. In the apparatus shown in said patent, however, it was possible to exert such pressure a single time only, and said apparatus was therefore adapted for the purpose of taking instantaneous photographs only, except when used in connection with a camera shutter adapted to make a longer exposure of predetermined length upon a single exertion of such pressure. A great many camera shutters as now constructed, however, require a plurality of manipulations in order to make a time exposure. In other words, said shutters must be operated once to open the shutter at the beginning of the exposure and a second time to close the shutter at the end of the exposure. The majority of such shutters are operated by the compression of an elastic bulb, said bulb being compressed once to open the shutter and a second time to close the same.

The objects of my present invention therefore are to produce a device, similar to that shown and described in my prior patent above referred to, which shall be adapted to compress the bulb of a photographic shutter or otherwise manipulate said shutter a plurality of times, which compressions or manipulations will take place at a predetermined time and in a predetermined relation to one another, thereby to obtain a "time exposure" of any desired length, which time exposure may be made at any predetermined time in the absence of the operator.

To these ends my invention, in its preferred form, comprises a receptacle adapted to receive the end of a flexible power transmitter; a suitable device, herein shown as a plunger, for exerting a pressure on the end of said transmitter; mechanism for operating said plunger, adapted to cause the same to exert a pressure and thereafter to be withdrawn into its initial position; means for restraining said operating mechanism; a plurality of time-controlling mechanisms; and means, independent for its motive power of the time controlling mechanisms and of the plunger operating mechanism, and controlled by both of said time-controlling mechanisms, for releasing said restraining means, thereby permitting said operating mechanism to actuate said plunger at a plurality of times controlled by said time controlling mechanisms.

In the accompanying drawings, which illustrate one construction in which my invention may be embodied, Figure 1 is a front elevation, and Fig. 2 a rear elevation of my improved device. Fig. 3 is a vertical sectional view thereof taken substantially on the line 3—3, Fig. 5. Fig. 4 is a similar view taken substantially on the line 4—4, Fig. 5. Figs. 5, 6 and 7 are horizontal sectional views taken respectively on the lines 5—5, 6—6 and 7—7, Fig. 4, the spring for holding the time-controlling mechanisms inoperative being omitted in Fig. 5. Fig. 8 is an enlarged detail sectional view taken substantially on the line 8—8, Fig. 6.

In the drawing parts which correspond to similar parts in the device shown in my prior patent, above referred to, are designated by reference characters similar to those employed to designate the same parts in my said application although many of these parts will preferably be somewhat changed or modified in form in order to adapt the same more particularly to the device herein shown and described.

The operating mechanism of my device is inclosed within a suitable casing 12, and the moving parts thereof are supported by said casing and by a suitable frame, generically indicated by the numeral 120, within said casing. The casing 12 preferably comprises a bottom plate 26, a front plate 27, a backplate 28 and a preferably removable hood or cover plate 29. The casing 12 is preferably provided at its top with a pair of rings 22 adapted to receive suitable chains or cords by which the device may be suspended from a bracket similar to that shown and described in my application above referred to.

The apparatus as a whole is preferably operatively connected with the shutter mechanism of the camera by a flexible power transmitter, herein shown as the usual rubber tube terminating in a bulb which is received in a suitable receptacle, herein shown as a drawer 13, said drawer comprising a front plate 30 provided with a knob or handle 31, a bulb-retaining plate 32, a plurality of guide rods 33, and a bottom-plate 34 provided with a suitable spring 35 adapted to contact with a fixed part of the casing or frame and to guide said drawer in its movements and hold the same in properly adjusted position. The construction of the drawer 13 may be substantially the same as that of the corresponding drawer shown in my prior application above referred to, but is preferably arranged at the side of the casing, the rods 33 being guided in a suitable plate 73 constructed separate from the hood or cover 29 and provided with an opening through which the bulb-compressing plunger, hereinafter described, may operate.

The mechanism for compressing the bulb is preferably substantially as follows: Mounted to slide in suitable fixed guides 36 is a preferably tubular plunger 37 provided with a bulb-engaging knob or head 38. Suitably pivoted at 77 to said plunger 37 is a connecting rod or pitman 74 made adjustable in length by means of a suitable turn-buckle or other device 75, whereby the stroke of said plunger may be adjusted to accommodate the same to the dimensions of the bulb, said turn-buckle 75 being accessible for purposes of adjustment through a suitable opening in the bottom plate 26, said opening being normally closed by a removable plate 76. At its end opposite to the pivot 77, the pitman 74 is pivoted, at 78, to a lever 79 pivoted at 80 to a suitable frame 81 rigidly secured to the casing, said lever 79 being pivotally connected at its opposite end to a link 82 pivoted, at 83, to a second lever 84 also pivoted, at 85 to said frame 81. Mounted to turn upon suitable fixed bearings provided within the casing 12 is a vertical shaft 86 provided with an eccentric 87 surrounded by an eccentric strap 88 pivotally connected at 89 to said lever 84.

Preferably, and as herein shown, a suitable spring 121 is interposed between the plunger 37 and its guide 36; said spring being secured at its ends, by suitable studs or other devices 122, to brackets 123 and 124 secured respectively to the guide 36 and plunger 37.

It will now be seen that each complete rotation of the shaft 86 will cause a reciprocating movement of the plunger 37, thereby compressing the bulb and thereafter withdrawing the bulb compressing knob or head 38. By means of the mechanism comprising the levers 79 and 84 and the link 82 the slight reciprocating movement imparted to the eccentric strap 88 is converted into a greater movement of the plunger 37, the object of this arrangement being to produce the desired amount of movement of the plunger 37 by mechanism occupying the least possible amount of space.

Suitable means are provided for turning the shaft 86 said means, as herein shown, comprising a flat helical spiral or clock spring 90 suitably secured to a fixed part of the framework and to the shaft 86. Suitable means are provided for winding up said spring 90, said means preferably comprising a gear 91 secured to the lower end of the shaft 86 and coöperating with a gear 92 adapted to be turned by a suitable key or handle 93 arranged beneath the casing 12.

During the process of winding up, the spring 90 is loaded with a certain amount of energy. When the spring is released this energy is liberated. The part of this energy which is liberated during the first half of the rotation of the shaft 86 is used to compress the bulb, the part however liberated during the second half of the rotation of the shaft 86 goes to waste, or rather is consumed by a jar when the plunger reaches the limit of its rearward movement and is stopped by mechanism hereinafter described. The additional spring 121, however, will add to the energy of the spring 90 during the first half of the rotation of the shaft 86 when the bulb is being compressed and will consume part of the energy of this spring during the second half of the rotation of the shaft 86 and thus moderate the jar between the parts tending to stop the shaft and plunger.

In order to lock the shaft 86 against movement under the influence of the spring 90, until the proper time for the compression of the bulb, the following mechanism is provided. Secured to the upper end of the shaft 86 is a ratchet segment 94 provided with a plurality of ratchet teeth 95, 96, 97, respectively. Said ratchet teeth are arranged in different planes one above the other, the tooth 95 being the highest and the tooth 97 the lowest. Pivoted at 98 to a suitable part of the casing or frame is a lever 99 provided at its end with a pivoted pawl 100 normally held in engagement with one of the teeth on the ratchet segment 94 by means of a suitable spring 101. The faces of the teeth 95, 96 and 97, or that of the pawl 100, or both, are preferably beveled or arranged at an inclination to the direction of movement of said pawl on the principle of the inclined plane to facilitate the release of said teeth by said pawl as hereinafter described.

Pivoted at 102 to the lever 99 is a link 103, pivoted at its opposite end to a lever 49, suitably pivoted at 50 to the casing or frame, said lever being provided at its end opposite to the pivot 50 with a suitable operating rod 51 provided at its outer end with a knob 52, whereby said lever 49 may be depressed in opposition to a suitable spring 46 tending normally to elevate the same. The lever 49 is provided with two upwardly extending arms or fingers 104, 105, respectively, said fingers being preferably provided at their upper ends with suitable rollers 53 and 530. The arm or finger 104 is adapted to contact at its upper end with a substantially circular cam 54 provided with a notch or recess 55 adapted to receive the end of said finger 104, and with a projecting stop 56 adapted to limit the turning of said cam by contacting with said finger 104. The finger 105 is adapted to contact with a circular cam 540, similar to the cam 54, and provided with a recess 550 adapted to receive the end of said finger 105 and with a stop or projection 560 adapted to contact with a fixed stop 106 for the purpose of limiting turning movement of said cam 540. The relative lengths of the fingers 104, 105, the depths of the recesses 55 and 550, and the size and arrangement of the lever 49 and the parts controlled thereby, are such that when the finger 104 is in contact with the periphery of the cam 54, as shown in Fig. 3, the finger 105 will be out of contact with the periphery of the cam 540, and the pawl 100 will be at a proper elevation to engage the tooth 95; while if the cam 54 be turned into such a position that the finger 104 enters the recess 55, said finger 105 will be brought into contact with the periphery of the cam 540, at which time the pawl 100 will be at a proper elevation to engage the tooth 96, said recess 55, however, being of such a depth as to permit additional upward movement of the lever 49, under the influence of the spring 46, when the cam 540 is turned to bring the recess 550 into a position to receive the finger 105, thereby bringing the pawl 100 to a proper elevation to engage the tooth 97.

Suitable independent time controlling mechanisms are provided for turning the cams 54 and 540, said mechanisms preferably and as herein shown comprising two independent clock-works generically indicated in Fig. 4 by the numerals 58 and 580 respectively. Said clock-works are provided with the usual winding posts 60 and 600, respectively, upon which are mounted the cams 54 and 540, and provided at the exterior of the casing 12 with suitable pointers 68 and 680 adapted to coöperate with suitable dials 67 and 670 graduated to indicate seconds or other divisions of time. The cams 54 and 540 and pointers 68 and 680 are so positioned relative to the posts 60 and 600, fingers 104 and 105, and dials 67 and 670 that when the recesses 55 and 550 are opposite the fingers 104 and 105 the pointers 68 and 680 will respectively indicate zero upon the dials 67 and 670. The clock works 58 and 580, cams 54 and 540, pointers 68 and 680 and dials 67 and 670 may each be substantially similar to the clock-work, cam, pointer, and dial shown in my prior application above referred to and substantially similar to one another, with the exception that the clockwork 580 may be, if desired, and preferably is so designed and arranged as to be capable of running for a greater length of time than the corresponding clockwork 58, the dial 670 being correspondingly graduated. Means are provided for turning the winding posts 60 and 600 to bring the cams 54 and 540 into any predetermined initial position, indicated upon the dials 67 and 670, and at the same time to wind up the main springs 59 and 590 of the clockworks, said means as herein shown comprising suitable keys 61 and 610 secured to the winding posts 60 and 600. The positions into which the cams 54 and 540 are initially turned by the keys 61 and 610 will determine the times which must elapse, after starting the clockworks, before the recesses 55 and 550 are brought opposite the fingers 104 and 105 respectively, and these times will be respectively indicated upon the dials 67 and 670.

For reasons that will hereinafter appear it is necessary that the two clock-works 58 and 580 be started at precisely the same instant. To this end means are provided for restraining the operation of these clockworks and for simultaneously releasing them, said means, as herein shown, comprising a flat spring 69 suitably secured at its center to a fixed part of the frame, and engaging at its free ends suitable moving parts of each of said clock-works, preferably the vibrating members 66 and 660 forming part of the escapement mechanisms of said clockworks. In order to raise the two ends of the spring 69 simultaneously, cams 70 and 700 are provided, said cams being mounted on stud shafts 106, 107 carrying respectively gears 108, 109, each engaging an intermediate gear 110 mounted upon a stud shaft 112 provided at the exterior of the casing with a suitable key or other device 72. As will now be seen turning of the key 72 will result in the simultaneous turning of the cams 70 and 700 and a simultaneous release of the two clock-works.

The operation of the mechanism above described is as follows: The operator by turning the key 61 will move the pointer 68 to indicate upon the dial 67 the time which he wishes to elapse before the exposure is made. He then turns the key 610 to cause the pointer 680 to indicate upon the dial 670 a time greater than the time indicated on the dial 67 by the number of seconds representing the length of the exposure which he wishes to have made. For example, if he wishes the exposure to commence eighteen seconds after starting the mechanism, and wishes the exposure to be of two seconds' duration, the pointer 68 will be set to indicate 18 seconds and the pointer 680 to indicate 20 seconds. The parts now being in the relative positions shown in Fig. 3 the mechanism is started by giving the key 72 substantially a quarter turn. The two clockworks 58 and 580 will now commence to turn the cams 54 and 540, and at the end of eighteen seconds the recess 55 will be brought opposite the finger 104. The lever 49, under the influence of the spring 46, will now be moved upwardly until the finger 105 contacts with the periphery of the cam 540. As a consequence of this movement the link 103 is moved upwardly, the lever 99 tilted slightly, and the pawl 100 depressed sufficiently to release the tooth 95 on the segment 94, thus permitting the spring 90 to turn the shaft 86 substantially one complete rotation, or until the tooth 96 on the segment 94 comes into contact with the pawl 100. During this rotation the plunger 37 will be given one complete reciprocation and the bulb will be compressed once, thus opening the camera shutter. At the end of twenty seconds the recess 550 of the cam 540 will be brought opposite the finger 105, and the lever 49 will be again moved upwardly under the influence of its spring 46, the depth of the recess 55 in cam 54 being sufficient to permit of this additional movement. The pawl 100 carried by the lever 99 will now be depressed an additional amount, thus releasing the tooth 96 and permitting the shaft 86 to make another substantially complete rotation, or until the tooth 97 comes into contact with the pawl 100. This rotation of the shaft 86 causes a second reciprocation of the plunger 37 and a second compressing of the bulb, thus closing the camera shutter which has remained open for two seconds, the difference between eighteen seconds and twenty seconds. The entry of the fingers 104 and 105 into the recesses 55 and 550 causes the immediate discontinuation of the movement of the cams 54 and 540, respectively, and consequently of the corresponding clockworks. These clockworks are therefore automatically stopped with the pointers 68 and 680 indicating zero on the dials 67 and 670.

In order to reset the mechanism after the exposure has been made the following operations are performed. The bulb is first removed from the receptacle 13 in order to prevent accidental compression thereof during rewinding. The key 72 is then turned to release the spring 69 and thereby lock the clockworks. The operator then places the thumb of one hand upon the knob 52, pressing downwardly thereon to remove the fingers 104 and 105 from the corresponding recesses in the cams 54 and 540, and with the other hand winds up the spring 90 by means of the crank or key 93. Without releasing the knob 52, the key 61 is now given a slight turn sufficient to remove the recess 55 from the path of the finger 104 and the parts will be locked in set position, ready for a new setting of the cams 54 and 540 in accordance with the exposure next to be made.

From the foregoing it will be seen that I have provided an apparatus which will operate reliably to impart to a shutter-actuating mechanism a plurality of impulses which may be made to bear substantially any predetermined timed relation to one another and to the time of starting of the apparatus.

The mechanism for compressing the bulb is entirely independent, for its actuating force, of the clockworks, the springs 90, 121, and 46 being made as strong as may be necessary for the efficient operation of the device, while the clockworks may be made as reliable in their operation as those of an ordinary time-piece, as the only work which they are called upon to perform is the turning of the cams 54 and 540 which offer little resistance by virtue of their substantially circular form.

While I, in order that my invention may be readily understood, have shown and described the same as embodied in a particular construction, I wish it to be distinctly understood that I do not limit myself to the precise construction shown, it being obvious that many changes might be made therein without departing from the spirit and scope of my invention.

Having thus described my invention what I claim and desire to secure by Letters Patent is:—

1. A device for automatically operating a photographic camera, comprising, in combination, means for compressing a shutter bulb, actuating means therefor adapted to cause said compressing means to impart to said bulb a plurality of successive compressions, and mechanism for controlling the time of said compressions and the interval therebetween, thereby determining the time and duration of the exposure.

2. A device for automatically operating a photographic camera comprising, in combination, means for holding a flexible power transmitter, means for operating upon said transmitter to operate the camera shutter, actuating means adapted to cause said operating means to perform a plurality of successive operations for opening and closing said shutter, and clockwork mechanism for controlling the time of said operations and the interval therebetween, thereby determining the time and duration of the exposure.

3. A device for automatically operating a photographic camera comprising, in combination, means for holding a shutter bulb, a member for compressing said bulb, actuating means adapted to cause said member to impart to said bulb a plurality of successive compressions, and mechanism for controlling the time of said compressions and the interval therebetween, thereby determining the time and duration of the exposure.

4. In a device of the character described, the combination with a member for operating the shutter of a photographic camera and means for actuating said member provided with a plurality of stops, of a restraining device, time controlling mechanism, automatic means controlled by said time controlling mechanism for moving said restraining device into positions to engage said stops successively, and locking mechanism for said time controlling mechanism.

5. In a device of the character described, the combination with means for operating the shutter of a photographic camera, of a plurality of time-controlling mechanisms each adapted to control the operation of said operating means, means for restraining the operation of said time-controlling mechanisms and means for simultaneously releasing said mechanisms.

6. In a device of the character described, the combination with a member for actuating the shutter operating means of a photographic camera, and means for restraining said member, of a plurality of time-controlling mechanisms each adapted to control said restraining means.

7. In a device of the character described, the combination with means for holding the end of a flexible power transmitter, a plunger for operating upon said transmitter, a shaft, and means for rotating said shaft, of means intermediate said shaft and plunger whereby said plunger is operated when said shaft is rotated, and constructed and arranged to permit said shaft to rotate a plurality of times, time-controlling mechanism for controlling a plurality of successive operations of said shaft, and locking mechanism for said time controlling mechanism.

8. In a device of the character described, the combination with means for holding the end of a flexible power transmitter, a plunger for operating upon said transmitter, a shaft, and means for rotating said shaft, of means intermediate said shaft and plunger whereby said plunger is operated when said shaft is rotated, time controlling mechanism for controlling said shaft, and locking mechanism for said time controlling mechanism.

9. In a device of the character described, the combination with means for compressing the bulb of a camera shutter and means for actuating said compressing means, of means for restraining said actuating means, and a plurality of time-controlling mechanisms each adapted to control said restraining means.

10. In a device of the character described, the combination with means for holding a flexible power transmitter and a reciprocatory plunger adapted to operate upon said transmitter, of means for reciprocating said plunger, means for restraining said reciprocating means, means for withdrawing said restraining means, and a plurality of time-controlled devices each adapted to control said withdrawing means.

11. In a device of the character described, the combination with means for operating the shutter of a photographic camera, means for restraining said operating means, and means tending normally to withdraw said restraining means, of a plurality of time-controlling mechanisms, a cam operated by each of said mechanisms, and means controlled by said cams for holding said restraining means in operative position and for releasing the same at a predetermined time.

12. In a device for automatically operating a photographic camera, in combination, means for holding the end of a flexible power transmitter, means for opening the camera shutter by acting on the end of said power transmitter, mechanism for controlling the time of operation of said opening means including a restraining device adapted for movement into and out of engagement with said shutter opening means, said shutter opening means and said restraining device being provided with interengaging surfaces one of which is arranged at an inclination to the direction of movement of said restraining device on the principle of the inclined plane to facilitate the release of said shutter opening means by said restraining device.

13. In a device of the character described, in combination, stationary means for holding the end of a flexible power transmitter, a plunger, an actuator for advancing said plunger to act upon the end of said transmitter and for thereafter withdrawing the same, means whereby the forward limit of movement of said plunger is rendered variable, and time controlling mechanism for controlling said actuator.

14. In a device of the character described, in combination, stationary means for holding the end of a flexible power transmitter, a plunger, a rotary shaft, a spring for turning said shaft, mechanism for transforming rotary movement of the said shaft into a reciprocatory movement of said plunger, said mechanism including a connecting rod and means for adjusting the length of said rod, and time controlling mechanism for controlling the operation of said shaft.

15. In a device of the character described, the combination with means for holding the end of a flexible power transmitter and a plunger adapted to exert a pressure upon said transmitter, of a spring for actuating said plunger and a plurality of time-controlling mechanisms each adapted to permit said spring to operate at a predetermined time.

16. In a device of the character described, the combination with a plunger and mechanism for operating said plunger, of a ratchet segment operatively connected to said operating mechanism and provided with a plurality of teeth, a lever, and automatic time-controlled means for moving said lever into positions to engage said teeth successively.

17. In a device of the character described, the combination with a plunger and mechanism for operating said plunger, of a ratchet segment operatively connected to said operating mechanism and provided with a plurality of teeth, located in different planes, a lever, and automatic time-controlled means for moving said lever adapted to cause the same to engage said teeth successively.

18. In a device of the character described, the combinaton with means for operating the shutter of a photographic camera, of a plurality of time-controlling mechanisms, a cam rotated by each of said mechanisms, a lever controlled by both of said cams, and means operated by said lever for controlling said shutter-operating means.

19. In a device of the character described, the combination with a member for compressing the bulb of a camera shutter and an actuator for said member, of a plurality of time controlling mechanisms adapted successively to lock said member and actuator against operation and to release the same at predetermined times.

20. In a device of the character described, the combination with a plunger, of a rotary actuator, means operated by said actuator for reciprocating said plunger, a spring for turning said actuator, mechanism for controlling the time of operation of said spring, and an additional spring for accelerating the action of said first-named spring during the first half of the rotation of said actuator and for retarding said action during the second half of said rotation.

21. In a device of the character described, the combination with means for actuating the shutter of a photographic camera and a flexible power transmitter connecting said actuating means and shutter, of a plurality of clock-works, means controlled by both of said clockworks for controlling said actuating means, and means for locking each of said clockworks.

22. In a device of the character described, the combination with means for operating the shutter of a photographic camera, of a plurality of clockworks each adapted to control the operation of said operating means, means for restraining the operation of said clockworks, and means for simultaneously releasing said clockworks.

23. In a device of the character described, the combination with means for actuating the shutter operating means of a photographic camera, of a plurality of time-controlling mechanisms each adapted to control the operation of said actuating means, means for setting said time-controlling mechanisms, and means for holding said time-controlling mechanisms inoperative after being set.

24. In a device of the character described, the combination with means for actuating the shutter operating means of a photographic camera, of a plurality of clockworks each adapted to control the operation of said actuating means, means for setting said clockworks, and means for holding said clockworks inoperative after being set.

25. In a device for automatically operating a photographic camera, the combination with means for opening the camera shutter and flexible means connecting said shutter opening means and shutter, of mechanism for controlling the time of operation of said shutter opening means including a restraining device adapted for movement into and out of engagement with said shutter opening means, said shutter opening means and said restraining device being provided with interengaging surfaces arranged at an inclination to the plane of movement of said restraining device.

26. In a device of the character described, in combination, means for holding the end of a flexible power transmitter, a plunger for exerting a pressure on said transmitter, a shaft and connections for actuating said plunger, a spring for turning said shaft, a stop on said shaft to restrain its movement, a time-controlling mechanism, means intermediate said stop and said time controlling mechanism for releasing said shaft to cause said plunger to be operated, a second stop on said shaft to intercept its movement after the operation of said plunger, a second time-controlling mechanism, and means intermediate said last-named stop and time-controlling mechanism to release said shaft a second time to cause the plunger to make a second operation.

27. In a device of the character described, in combination, means for holding the end of a flexible power transmitter, a plunger for exerting a pressure on said transmitter, a shaft and connections for actuating said plunger, a spring for turning said shaft, a stop on said shaft to restrain its movement, a time-controlling mechanism, means for locking said time-controlling mechanism, means intermediate said stop and said time-controlling mechanism for releasing said shaft to cause said plunger to be operated, a second stop on said shaft to intercept its movement after the operation of said plunger, a second time-controlling mechanism, means for locking said last-named time-controlling mechanism, and means intermediate said last-named stop and time-controlling mechanism to release said shaft a second time to cause the plunger to make a second operation.

28. In a device of the character described, the combination with means for operating a camera shutter, of means for restraining said operating means, a clockwork for controlling said restraining means, means for simultaneously releasing said operating means and causing the discontinuation of the movement of said clockwork, a second clockwork for controlling said restraining means, and means for simultaneously releasing said operating means a second time and causing the discontinuation of the movement of said second clockwork.

29. In a device of the character described, the combination with means for compressing the bulb of a camera shutter, of means for restraining said bulb compressing means, a clockwork and an element moving with said clockwork for retaining said restraining means in operative position and releasing the same at a predetermined time, a second clockwork and a second element moving therewith for again retaining said restraining means in a second position and for releasing the same at a predetermined time.

30. In a device of the character described, the combination with means for operating a camera shutter, of means for restraining said operating means, a time-controlling mechanism and an element moving therewith for retaining said restraining means in operative position and releasing the same at a predetermined time, a second time-controlling mechanism and a second element moving therewith for again retaining said restraining means in a second position and for releasing the same at a predetermined time, and means for locking said time-controlling mechanisms.

31. In a device of the character described, in combination, means for operating the shutter of a photographic camera, means for actuating said operating means, means for restraining said actuating means, a plurality of time-controlling mechanisms and an element moving with each of said mechanisms for successively holding said restraining means against movement in a plurality of positions and for releasing the same successively at predetermined times.

32. In a device for automatically opening and closing the shutter of a photographic camera at predetermined times, in combination, means for holding the end of a flexible power transmitter communicating with said shutter, means for operating upon said transmitter, a clockwork for controlling the operation of said operating means to open said shutter, a continuous series of interengaging members intermediate said clockwork and said operating means, said members being interengaged during the entire period of movement of said clockwork, and means for controlling the second operation of said operating means to close said shutter.

33. In a device for automatically opening and closing the shutter of a photographic camera at predetermined times, in combination, means for holding the end of a flexible power transmitter communicating with said shutter, means for operating upon said transmitter, a time-controlling mechanism for controlling the operation of said operating means to open said shutter, means for locking said time controlling mechanism, a continuous series of interengaging members intermediate said time controlling mechanism and said operating means, said members being interengaged during the entire period of movement of said time-controlling mechanism, and means for controlling the second operation of said operating means to close said shutter.

34. A device for automatically operating a photographic camera comprising, in combination, means for holding a flexible power transmitter, means for operating upon said transmitter to operate the camera shutter, actuating means adapted to cause said operating means to perform a plurality of successive operations for opening and closing said shutter, clockwork mechanism for controlling the time of said operations and the interval therebetween, thereby determining the time and duration of the exposure, and locking mechanism for said clockwork mechanism.

35. A device for automatically operating a photographic camera comprising, in combination, means for holding a flexible power transmitter, means for operating upon said transmitter to operate the camera shutter, actuating means adapted to cause said operating means to perform a plurality of successive operations for opening and closing said shutter, clockwork mechanism for controlling the time of said operations and the interval therebetween, thereby determining the time and duration of the exposure, locking mechanism for said clockwork mechanism, and means for manually releasing said clockwork mechanism.

In testimony whereof I affix my signature, in presence of two witnesses.

ARTHUR LATTAU.

Witnesses:
 JAMES BARKER,
 REX H. BELL.

Copies of this patent may be obtained for five cents each, by addressing the "Commissioner of Patents, Washington, D. C."